United States Patent
Perry

(10) Patent No.: US 8,117,415 B2
(45) Date of Patent: *Feb. 14, 2012

(54) STORAGE DEVICE ESTIMATING A COMPLETION TIME FOR A STORAGE OPERATION

(75) Inventor: Nir Perry, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 631 days.

This patent is subject to a terminal disclaimer.

(21) Appl. No.: 11/781,259

(22) Filed: Jul. 22, 2007

(65) Prior Publication Data

US 2010/0287314 A1 Nov. 11, 2010

Related U.S. Application Data

(60) Provisional application No. 60/825,930, filed on Sep. 18, 2006.

(51) Int. Cl.
*G06F 12/00* (2006.01)
*G06F 13/00* (2006.01)
*G06F 13/28* (2006.01)

(52) U.S. Cl. ......... 711/167; 711/100

(58) Field of Classification Search ............ 711/167, 711/100
See application file for complete search history.

(56) References Cited

U.S. PATENT DOCUMENTS

| | | | | |
|---|---|---|---|---|
| 5,640,081 A * | 6/1997 | Austin et al. | .......... | 320/127 |
| 6,571,147 B1 * | 5/2003 | Kashihara | .......... | 700/100 |
| 2002/0152374 A1 | 10/2002 | Mayfield | | |
| 2003/0163478 A1 | 8/2003 | Kirkland | | |
| 2004/0162983 A1 * | 8/2004 | Gotoh et al. | .......... | 713/171 |
| 2008/0034174 A1 * | 2/2008 | Traister et al. | .......... | 711/159 |

* cited by examiner

*Primary Examiner* — Sheng-Jen Tsai
(74) *Attorney, Agent, or Firm* — Beyer Law Group LLP

(57) ABSTRACT

A storage device or system provides to a host processor an estimation of a completion time of a storage operation. The completion time may be based on the duration of automatic storage operations, which are not administered by the host processor. The storage device includes a non-volatile memory and a controller. The storage system includes: a storage device having a non-volatile memory; and a controller module. The controller or controller module estimates the completion time of a storage operation and provides to the processor the estimated completion time before the storage operation completes.

23 Claims, 4 Drawing Sheets

STORAGE DEVICE ESTIMATING A COMPLETION TIME FOR A STORAGE OPERATION

CROSS-REFERENCE TO RELATED APPLICATIONS

This application claims priority under 35 U.S.C. §119(e) to U.S. Provisional Application No. 60/825,930, filed Sep. 18, 2006, which is hereby incorporated by reference in its entirety. This application is related to U.S. Patent Application of the same inventors, which is entitled "A METHOD OF PROVIDING TO A PROCESSOR AN ESTIMATED COMPLETION TIME OF A STORAGE OPERATION" and filed on the same day as the present application. This application, also claiming priority to U.S. Provisional Application No. 60/825,930, is incorporated in its entirety as if fully set forth herein.

BACKGROUND OF THE INVENTION

With advances in computer engineering, large amounts of information are stored in mass storage devices. Some of these storage devices use technology that integrates automatic memory operations, which are administered within the storage device. That is, the automatic memory operations are not administered by the processor of the host that uses the storage device. Examples of such automatic memory operations include garbage collection operations that reclaim and recycle dynamic memory that is not being used, wear leveling operations that increase the likelihood that cells within a flash memory system are worn fairly evenly, defragmentation operations that reduce the amount of fragmentation in file systems, and power fail protection operations that protect data from abnormal program termination and other data loss problems.

It is very difficult for a host to predict the time required to complete a storage operation such as write, read or delete. One reason is because the memory operations described above are automatically administered within the storage device and thus not by the host processor. The automatic memory operations cause the times to complete storage operations to vary considerably. For example, the longest time imaginable to write a 10 Mbyte file to a storage device might be 20 times longer than the shortest time.

In order to operate more efficiently, a host processor may respond as follows to the uncertainty in predicting the time required to complete storage operations:

The host processor may wait idly until the storage operation terminates. That is, the host processor and the storage device would work sequentially. Such procedure wastes processing time, because the host processor cannot perform other tasks while the storage operation executes.

Alternatively, after sending a storage command, the host processor can switch to another task and return to the original task after the storage operation terminates. However, as the storage operation may terminate before the host processor finishes switching tasks, the original task must wait longer than necessary to resume.

Another option is a process known as "polling," in which the host processor frequently checks if the storage operation in the storage device has completed. Such continuous interrogation consumes significant processing time.

Yet another option is, after sending a storage command to the storage device, the host processor can perform context switching to execute another task, execute the other task, and then perform context switching again to return to the original task. However, context switching is time-consuming, and, if the storage operation has not yet completed by the time that the processor returns to the original task, the host processor must perform context switching again and consume more time.

These options for optimizing processor efficiency do not account for the effect of automatic memory operations on the duration of storage operations. Information regarding the scheduling of automatic storage operations is not readily available to a processor in a host, because these operations are administered within the storage device. Because the effect of the automatic actions on storage operations is so significant, the optimization of processor efficiency is limited when one of the options described above is implemented. Thus, it would be desirable to account somehow for the effect of automatic memory operations on the duration of storage operations.

SUMMARY OF THE INVENTION

The present invention predicts the duration of storage operations by accounting for more factors than known in the prior art, such as the effect of automatic memory operation. The invention may be embodied as a storage device/system for a processor or as a method of performing a storage operation.

In one embodiment of the invention, a storage device has a non-volatile memory and a controller. The non-volatile memory may be a flash memory. The controller is operative to send data to the non-volatile memory and to retrieve data from the non-volatile memory in accordance with a storage command from a processor. The controller is configured to estimate a completion time of a storage operation associated with the storage command and to provide to the processor the estimated completion time. Depending on the mode of operation, the controller may begin estimating the completion time of the storage operation before or after the storage operation begins.

In another embodiment of the invention, a storage system for a processor of a host includes a storage device having a non-volatile memory and a controller module. The controller module of this embodiment is analogous to the controller of the first embodiment. The controller module may reside in the host.

Additional features and advantages of the invention will become apparent from the following drawings and description.

BRIEF DESCRIPTION OF THE DRAWINGS

For a better understanding of the invention with regard to the embodiments thereof, reference is made to the accompanying drawing, in which like numerals designate corresponding sections or elements throughout, and in which.

DETAILED DESCRIPTION OF THE INVENTION

The invention summarized above and defined by the claims below will be better understood by referring to the present detailed description of embodiments of the invention. This description is not intended to limit the scope of claims but instead to provide examples of the invention. The following discussion presents exemplary embodiments, which include a storage device for a processor, a storage system for a processor of a host, and a method of performing storage operations.

Figure 1:
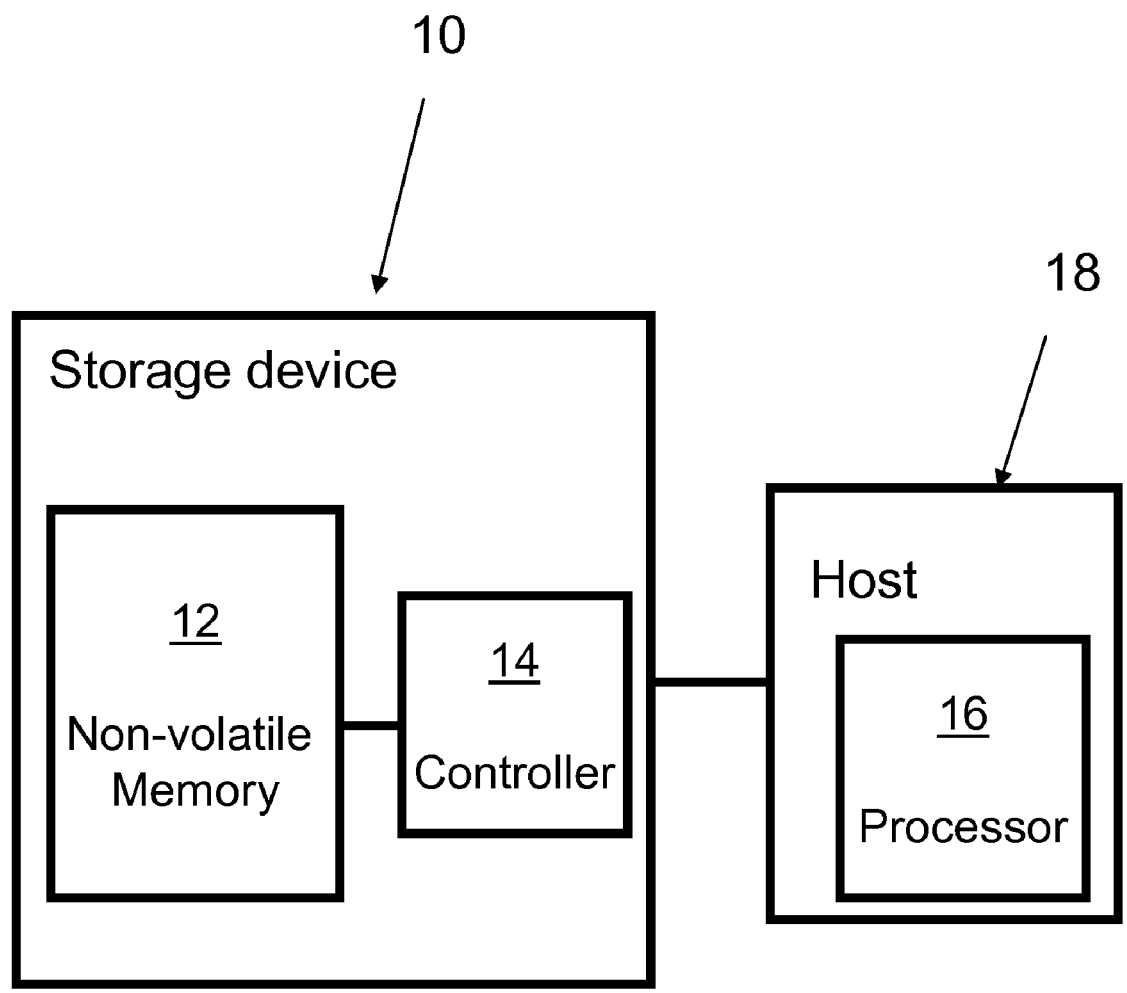
FIG. 1 is a block diagram illustration of a storage device in accordance with a first embodiment of the present invention.

FIG. 1 is a block diagram illustrating a storage device in accordance with a first embodiment of the invention. As shown, a storage device 10 interfaces with a processor 16 of a host 18. Storage device 10 includes a non-volatile memory 12 and a controller 14. The non-volatile memory 12 may be a flash memory. The controller 14 sends data and retrieves data from the non-volatile memory 12 in accordance with a storage command from the processor 16. The storage command may be a write command, a read command, or a delete command. The storage command is sent by the host to the storage device 10 and executed by the storage device 10 as a storage operation. The controller 14 is configured to estimate the completion time of the storage operation associated with the storage command and to provide to the processor 16 the estimated completion time. Depending on the mode of operation, the controller 14 may begin estimating the completion time of the storage operation before or after the storage operation begins. Three exemplary modes of operation are schematically represented in FIGS. 2a-2c.

Figure 2A:
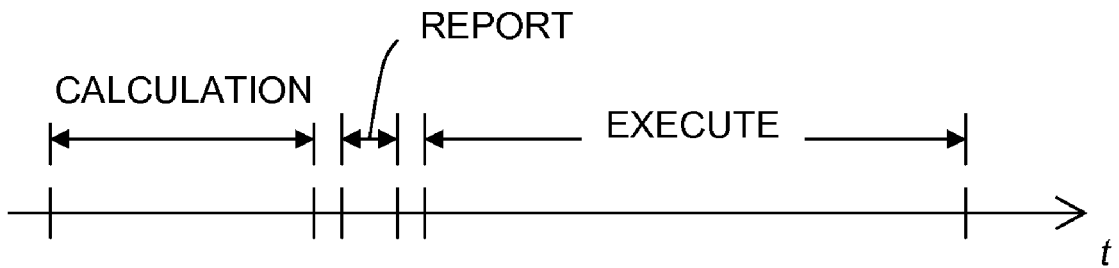
FIGS. 2a-2c schematically represent various modes of operation of the invention.

In the first mode, represented by FIG. 2a, the controller 14 begins and ends the calculations for estimating the completion time of the storage operation before initiating its execution.

Figure 2B:
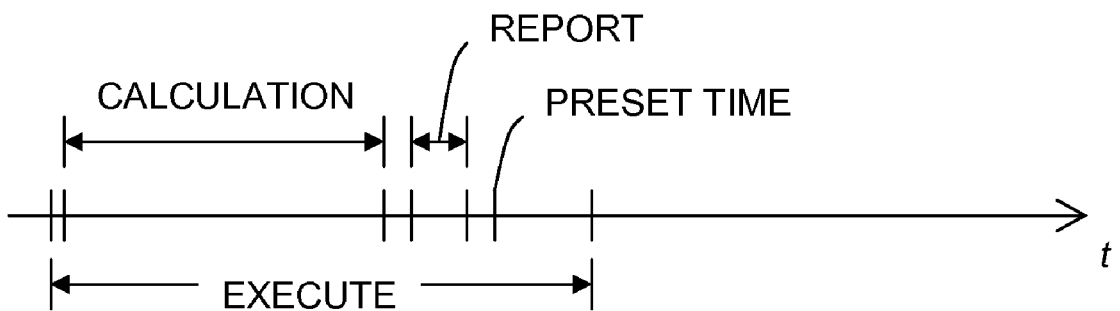

In the second mode of operation, represented by FIG. 2b, the controller 14 begins estimating the completion time of a storage operation after the storage operation begins. As the storage operation executes, the controller 14 experiences idle times while data are written to or read or deleted from non-volatile memory 12. The controller 14 performs the calculations to estimate the completion time of the storage operation only when the storage device would otherwise be idle. (Although the figures show solid lines for "CALCULATE" and "EXECUTE," these two processes may have multiple interruptions. The solid lines indicate the time span between the start and end of the "CALCULATE" and "EXECUTE" processes. Not represented in the figures for clarity is that the controller 14 administers the calculation of the estimated storage time during the times when it is not administering the execution of the storage operation.) In the mode of FIG. 2b, the controller 14 provides to the processor the estimated completion time before a preset time. If necessary, the execution of the storage operation will stop to provide the resources necessary to provide the estimated completion time to the processor before the preset time.

Figure 2C:
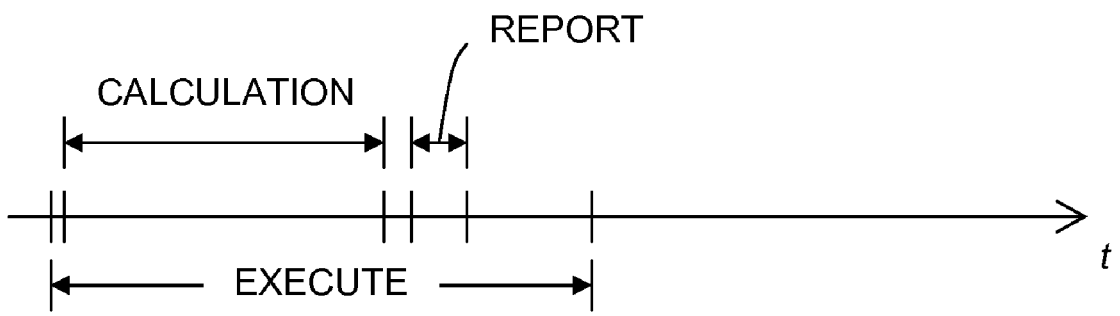

In the mode of operation represented by FIG. 2c, the controller 14 begins estimating the completion time of the storage operation after the storage operation begins, and it performs calculations to estimate the completion time only when the storage device 10 would otherwise be idle. In this mode, there is no preset time by which the controller 14 is required to provide the estimated completion time.

Other modes of operations may individually have one or more of the following features: The controller 14 may begin estimating the completion time upon receipt of the storage command or after the storage operation begins. The controller 14 may also begin estimating the completion time before initiating the storage operation. This may be useful if the host 18 needs the estimated completion time in order to determine which operation to perform while the storage command request is executed. The controller 14 may begin estimating the completion time when the storage device 10 is otherwise idle. The controller may be designed to finish estimating the completion time before initiating the storage operation. The controller may provide the estimated completion time to the processor before initiating the storage operation and/or before a pre-defined time interval (for example 3 ms, 5 ms, 5 clock ticks, etc.) has elapsed since receiving the storage command.

The estimated completion time may be based in part on anticipated automatic memory operations that are to be applied to the storage device. For example, the estimated completion time may be based in part on an anticipated wear leveling operation, garbage collection operation, power-fail protection operation, or defragmentation operation. The estimated completion time may be further based in part on an attribute of a specific storage area of the non-volatile memory 12 of the storage device 10. An "attribute" can be any information characterizing memory cells of a specific storage area of the non-volatile memory, including but not limited to content reliability, density, transaction speed, endurance, or any combination thereof. The estimated completion time may also be based in part on the type of the storage operation and/or on the amount of data associated with the storage operation.

Figure 3:
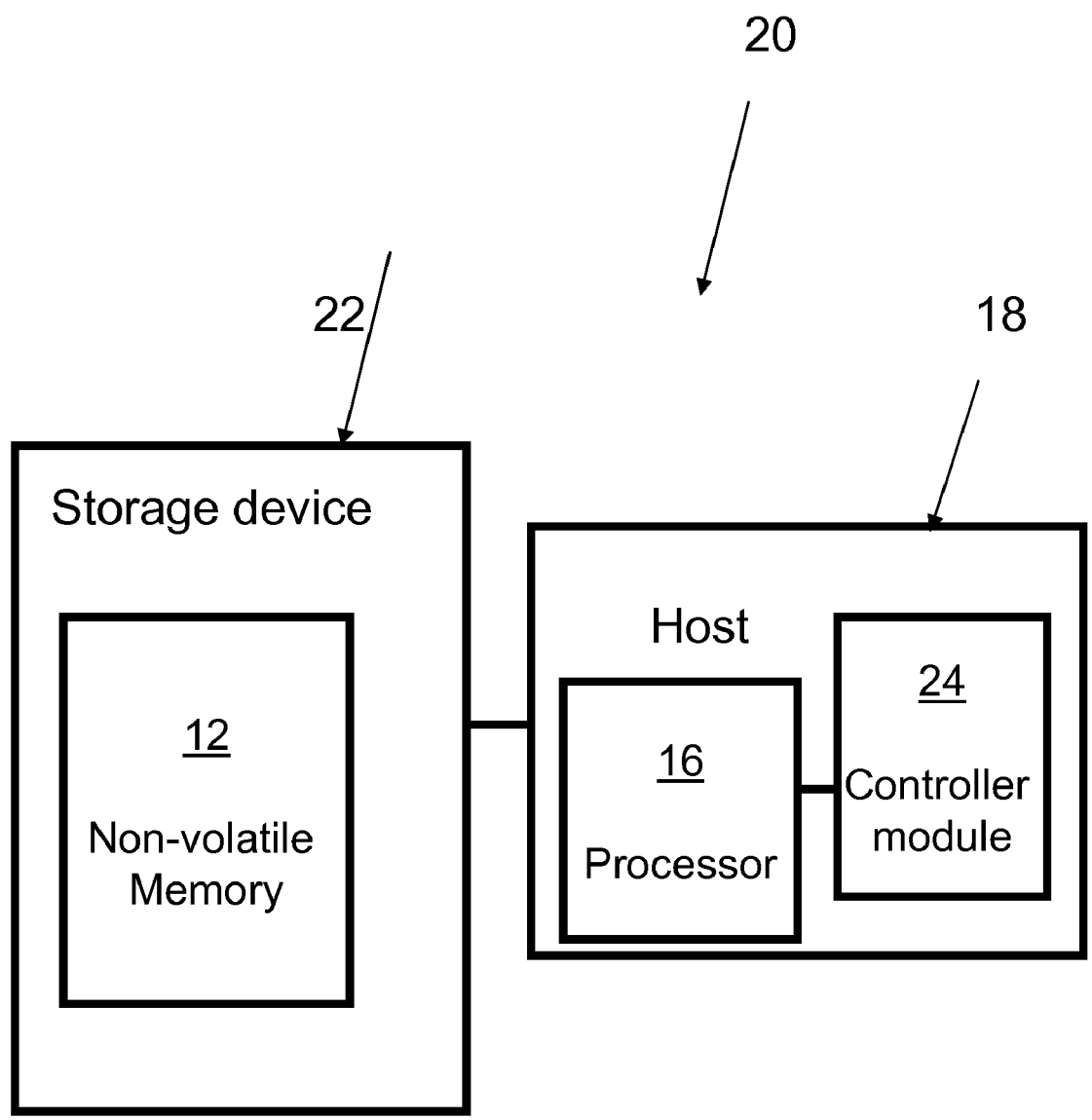
FIG. 3 is a block diagram illustration of a storage system in accordance with another embodiment of the present invention.

FIG. 3 is a block diagram illustrating a storage system in accordance with another embodiment of the invention. As shown, a storage system 20 includes a storage device 22 and a controller module 24. The storage device 22 has a non-volatile memory 12. The controller module 24 is analogous to controller 14 of FIG. 1 and functions accordingly. In the embodiment of FIG. 3, the controller module 24 resides in the host 12. However, other implementations are possible, such as configuring the controller module within a unit external to both the storage device and the host.

Figure 4:
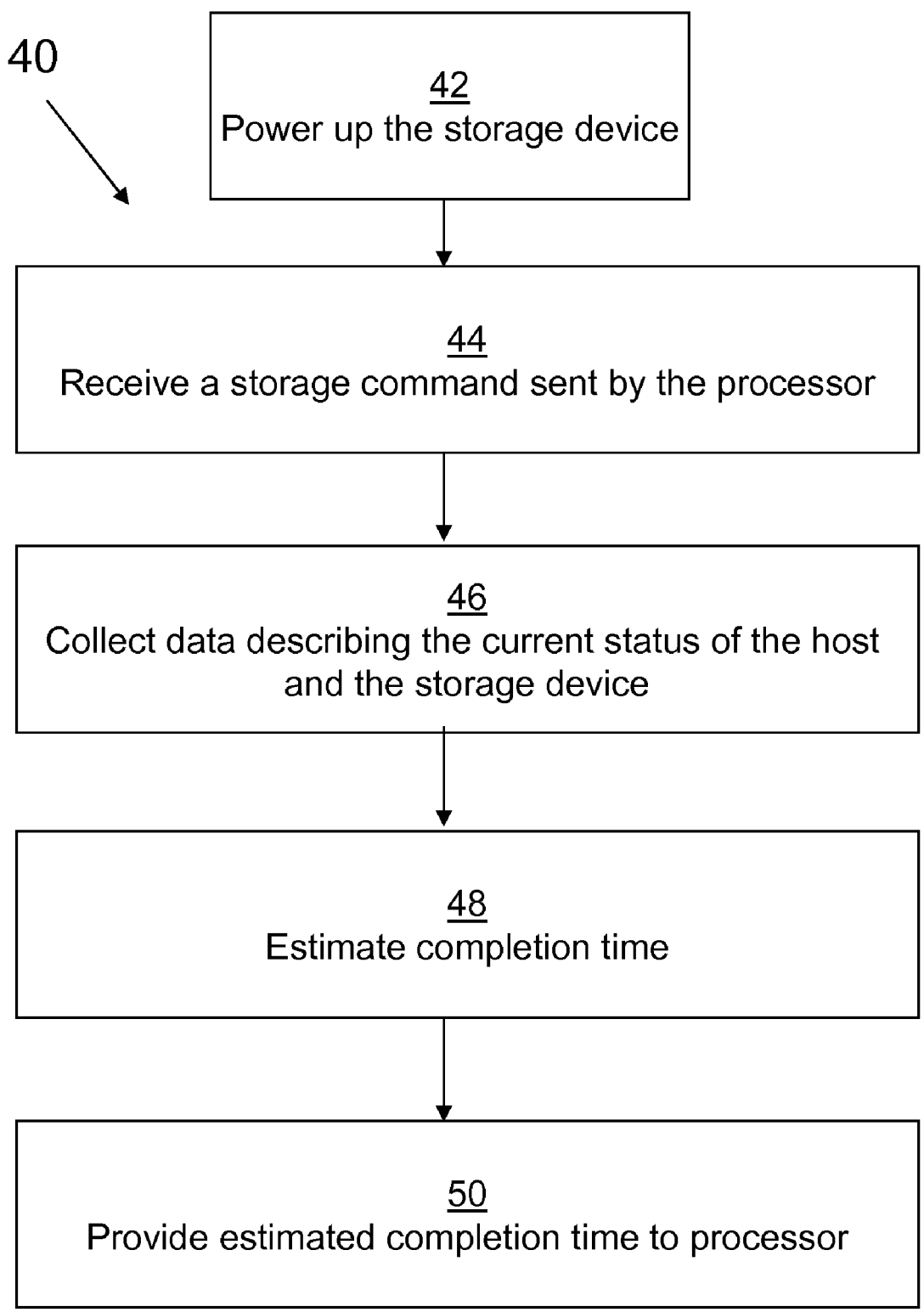
FIG. 4 is a flow chart representing a method of performing storage operations in accordance with an embodiment the present invention.

The present invention may also be embodied as a method of performing a storage operation that includes: receiving from a processor a storage command for the storage operation; estimating, using a controller of a storage device, a completion time of the storage operation; and providing the estimated completion time to the processor. FIG. 4 provides a flow chart 40 representing one embodiment of a method embodying the present invention.

In the initial step 42, the storage device is powered up. The controller may operate in any of the modes of operation discussed above. Step 42 includes the controller 14 of FIG. 1 or the controller module 24 of FIG. 3 collecting data associated with the attributes of the storage device. This data may include the cylinder-rotation frequency, read/write/erase times, error rates, and average error correction times.

In the next step 44, the controller receives a storage command sent by the processor. After receiving the storage command, the controller in step 46 collects data describing the current status of the storage device and the host that may affect the duration of the storage operation associated with the storage command. The data relating to the storage device may include the current location of the cylinder needle, the flash wear leveling status, and so on. The data relating to the host may include the battery status, the processor usage, and so on.

In the next step 48, the controller estimates the completion time. The estimation may be based in part on anticipated automatic memory operations that are to be applied on the storage device, including but not limited to an anticipated wear leveling operation, garbage collection operation, power-fail protection operation, defragmentation operation, etc. The estimation may also be based in part on an attribute of a specific storage area on the storage device. During the execution of step 48, the controller may begin estimating the completion time upon receipt of the storage command, after the storage operation begins, before initiating the storage operation or when the storage device is otherwise idle. The controller may finish estimating the completion time before initiating the storage operation. The controller may estimate the completion time based in part on anticipated automatic memory operations that are to be applied to the storage device, such as an anticipated wear leveling operation, garbage collection operation, power-fail protection operation, or defragmentation operation. The controller may also estimate the completion time based in part on an attribute of a specific storage area of the non-volatile memory of the storage device, on the type of the storage operation and/or on the amount of data associated with the storage operation.

In the final step 50, the controller provides the completion time to the processor of the host. The controller may provide this estimated completion time to the processor before initiating the storage operation and/or before a pre-defined time interval (for example 3 ms, 5 ms, 5 clock ticks, etc.) has elapsed since receiving the storage command.

The storage device collects all the relevant host status parameters that may affect the duration of the current storage operation, for example, battery status, CPU usage, and so on. At this point, the storage device has collected the following information in order to calculate the duration: 1. properties list of the storage device collected at step 42 (during power up); 2. current status of the storage device collected at step 46; 3. current status of the system collected at step 16; and, 4. parameters of the storage request command concluded from step 44.

The storage device then selects one of three alternative modes of operation for execution, calculation and reporting. The mode can be dictated by the host, either in setup or using a special command that can change the mode during run time. The mode can also be determined by the storage device itself, based on the default mode and exceptions that are derived from the above-mentioned four sources of information. For example, if the requested command is "read," does not offer idle time, mode A is preferable.

Each mode consists of performing the storage operation in calculating the operation duration according to the information collected in steps 42-46. In mode A (synchronic mode), the storage device has a specified time, relatively short, in which it can calculate the duration of execution (3 ms, 5 ms, 5 clock ticks, and so on). Upon receiving the storage request command, the storage device type awaits the operation duration using the four sources of information mentioned above, and completes the calculation within the specified time. Once the duration has been calculated and reported, the storage device executes the command.

In one embodiment, the calculation is made upon submission of the storage request and prior to execution of the request. This gives the host the earliest possible result about the expected duration, but delays the time of completion due to the time required to perform the calculation. This embodiment can be useful if the host needs calculation in order to decide which operation to perform while the storage request is executed.

In another embodiment, the host provides the storage device with a predefined time allowance to calculate the duration of the operation. The storage device can then immediately start executing the storage operation, and use idle time during its execution to calculate the duration. In most cases, the idle time will be sufficient to complete the duration calculation before expiration of the predefined time allowance. If the time allowance is about to expire and the calculation has not been completed, then the storage device will cause the execution of the storage request and will complete the calculation in order to report it on time. After completing the calculation, the storage device will resume execution of the storage request.

In another embodiment of the invention, the storage device immediately begins to execute the storage request, and uses idle time to calculate the expected duration. If the calculation is completed before the execution is completed, the storage device informs the host of the calculation result, for example, by an interrupt. If the storage request execution is completed before the calculation is completed, then the storage device informs the host of completion, using methods known in the prior art for interrupting a computer process.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A storage device for a processor included in a host device connected to the storage device, the storage device comprising:
   a non-volatile memory; and
   a controller operative to send data to said non-volatile memory and to retrieve data from said non-volatile memory in accordance with a storage command from said processor,
      wherein said controller is configured to collect host device data describing a current status of the host device and storage device data describing a current status of the storage device, to estimate a completion time of a storage operation associated with said storage command based upon said host device data and said storage device data, to begin estimating said completion time after receipt of said storage command and after execution of said storage operation begins, to complete said estimating before said execution ends, and to provide to the processor said estimated completion time,
      wherein the host device data includes at least one of battery status and current processor usage, and
      wherein the storage device data includes anticipated automatic memory operations.

2. The storage device of claim 1, wherein said controller is operative to perform calculations to estimate said completion time only when the storage device is otherwise idle, and to provide said estimated completion time to the processor before a preset time.

3. The storage device of claim 1, wherein said controller is operative to perform calculations to estimate said completion time only when the storage device is otherwise idle.

4. The storage device of claim 1, wherein said controller is operative to provide said estimated completion time before a pre-defined time interval has elapsed since receiving said storage command.

5. The storage device of claim 1, wherein said controller is operative to begin estimating said completion time when the storage device is otherwise idle.

6. The storage device of claim 1, wherein said controller is operative to estimate said completion time based in part on an anticipated wear leveling operation.

7. The storage device of claim 1, wherein said controller is operative to estimate said completion time based in part on an anticipated garbage collection operation.

8. The storage device of claim 1, wherein said controller is operative to estimate said completion time based in part on an anticipated power-fail protection operation.

9. The storage device of claim 1, wherein said controller is operative to estimate said completion time based in part on an anticipated defragmentation operation.

10. The storage device of claim 1, wherein said controller is operative to estimate said completion time based in part on an attribute of a specific storage area on the storage device.

11. The storage device of claim 1, wherein said non-volatile memory is a flash memory.

12. A storage system for a processor of a host, the storage system comprising:
   a storage device having a non-volatile memory; and
   a controller module operative to send data to said non-volatile memory and to retrieve data from said non-volatile memory in accordance with a storage command from said processor,
      wherein said controller is configured to collect host device data describing a current status of the host device and storage device data describing a current status of the storage device, to estimate a completion time of a storage operation associated with said storage command based upon said host device data and said storage device data, to begin estimating said completion time after receipt of said storage command and after execution of said storage operation begins, to complete said estimating before said execution ends, and to provide to the processor said estimated completion time,
   wherein the host device data includes at least one of battery status and current processor usage, and
   wherein the storage device data includes anticipated automatic memory operations.

13. The storage system of claim 12, wherein said controller module is operative to perform calculations to estimate said completion time only when the storage device is otherwise idle, and to provide said estimated completion time to the processor before a preset time.

14. The storage system of claim 12, wherein said controller module is operative to perform calculations to estimate said completion time only when the storage device is otherwise idle.

15. The storage system of claim 12, wherein said controller module resides in the host.

16. The storage system of claim 12, wherein said controller module is operative to provide said estimated completion time before a pre-defined time interval has elapsed since receiving said storage command.

17. The storage system of claim 12, wherein said controller module is operative to begin estimating said completion time when said storage device is otherwise idle.

18. The storage system of claim 12, wherein said controller module is operative to estimate said completion time based in part on an anticipated wear leveling operation.

19. The storage system of claim 12, wherein said controller module is operative to estimate said completion time based in part on an anticipated garbage collection operation.

20. The storage system of claim 12, wherein said controller module is operative to estimate said completion time based in part on an anticipated power-fail protection operation.

21. The storage system of claim 12, wherein said controller module is operative to estimate said completion time based in part on an anticipated defragmentation operation.

22. The storage system of claim 12, wherein said controller module is operative to estimate said completion time based in part on an attribute of a specific storage area on said storage device.

23. The storage system of claim 12, wherein said non-volatile memory if a flash memory.

* * * * *